Feb. 19, 1935.                W. P. SHOMAKER                1,992,046
                    ADJUSTABLE SUPPORT FOR ENDLESS CONVEYERS
                        Filed March 2, 1933    2 Sheets-Sheet 1
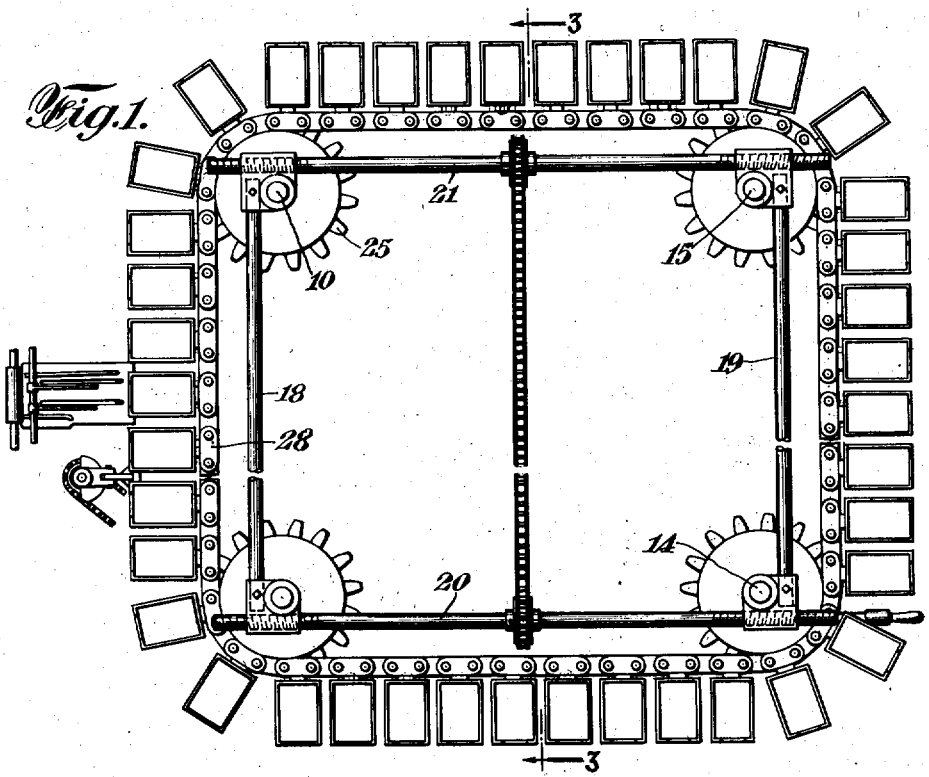
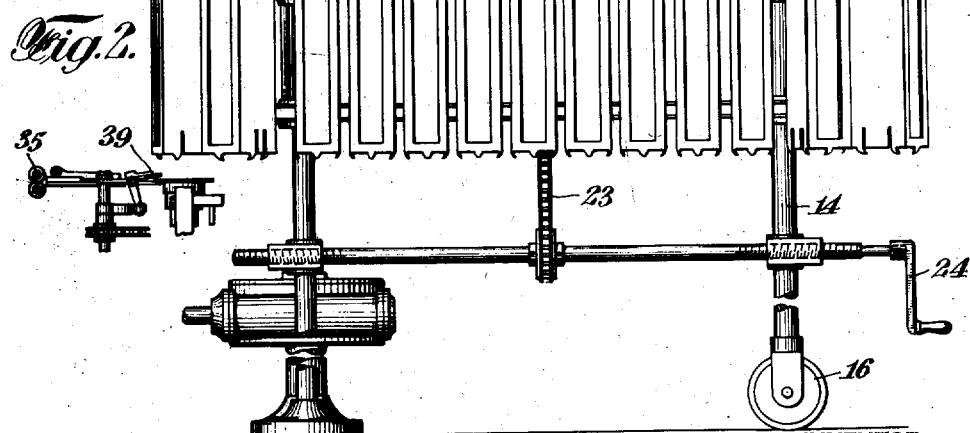
INVENTOR
Wesley P. Shomaker
BY Kenyon & Kenyon
ATTORNEYS Feb. 19, 1935.  W. P. SHOMAKER  1,992,046

ADJUSTABLE SUPPORT FOR ENDLESS CONVEYERS

Filed March 2, 1933  2 Sheets-Sheet 2

INVENTOR
Wesley P. Shomaker
BY
Kenyon & Kenyon
ATTORNEYS.

Patented Feb. 19, 1935

1,992,046

UNITED STATES PATENT OFFICE 1,992,046

ADJUSTABLE SUPPORT FOR ENDLESS CONVEYERS

Wesley P. Shomaker, Richmond, Va.

Application March 2, 1933, Serial No. 659,309

4 Claims. (Cl. 198—139)

This invention relates to adjustable supports for endless conveyers and has for an object a support which may easily and quickly be adjusted to permit variation in length of the conveyer.

A support embodying the invention comprises a pair of fixed posts and a pair of posts movable toward and away therefrom. The movable posts are connected to the fixed posts by means of rods having oppositely threaded ends whereby rotation of the rods causes movement of the movable posts relative to the fixed posts and means are provided for rotating the rods in unison. One of the fixed posts is rotatable and is provided with a pair of sprocket wheels and each of the remaining posts is provided with a pair of sprocket wheels rotatably mounted thereon. The sprockets support the conveyer and movement of the conveyer is effected by rotation of the first post. The conveyer is made up of a number of sections which are easily attached to or detached from each other, whereby the length of the conveyer may be varied as desired.

Other objects, novel features and advantages of this invention will be apparent from the following specification and accompanying drawings, wherein:

Fig. 1 is a plan view of a device embodying the invention;

Fig. 2 is a side elevation thereof;

Figure 3:
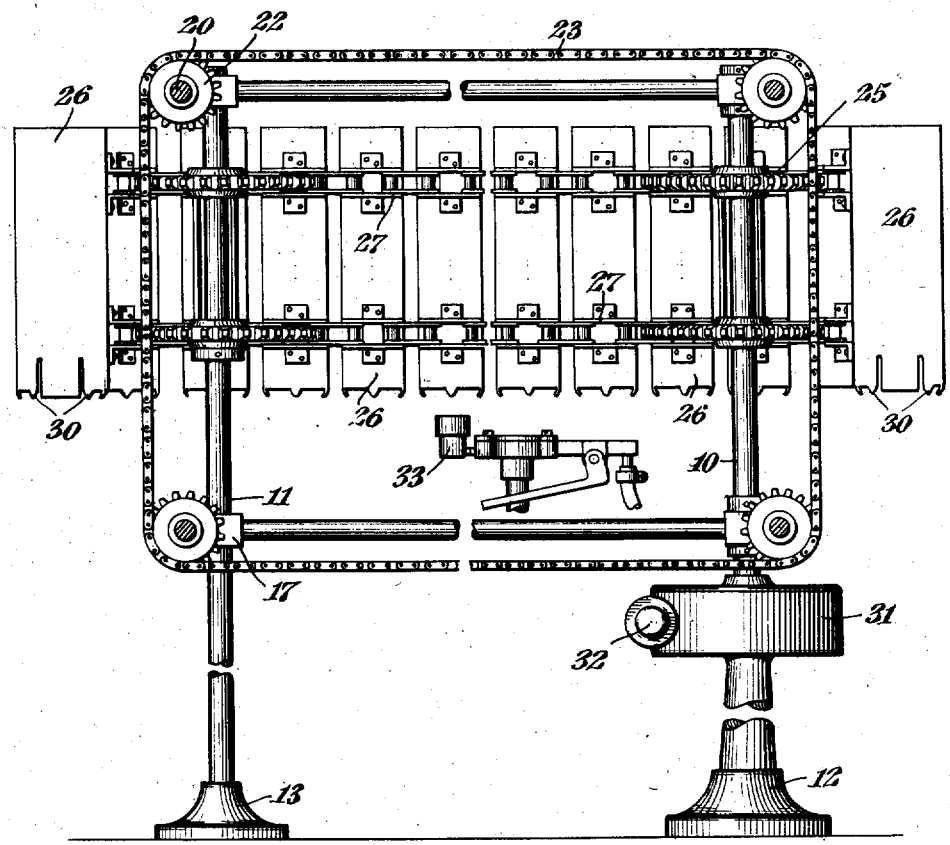
Fig. 3 is a section on the line 3—3 of Fig. 1.
Figure 4:
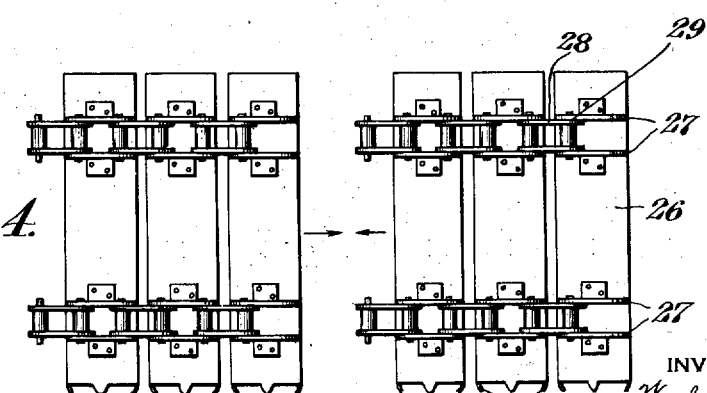
Fig. 4 is a detailed view showing the manner f connecting the conveyer sections.

The fixed posts 10 and 11 are provided with bases 12 and 13, the post 10 being rotatably supported by the base 12. The movable posts 14 and 15 are provided at their lower ends with wheels 16 so arranged as to permit easy movement of the posts 14 and 15 toward and away from the posts 10 and 11. An upper and lower bracket 17 are carried by each of the posts and rods 18 connect the posts 10 and 11 while rods 19 connect the posts 14 and 15, each of these rods having their ends rigidly connected to the brackets 17. The posts 14 and 15 are connected to the posts 10 and 11 respectively by means of rods 20 and 21 having reversely threaded ends extending into threaded sockets in the brackets 17. The rods 20 and 21 are provided with sprocket wheels 22 around which is trained a chain 23 and the lower rod 20 is provided with a handle 24 by means of which the rods may be rotated in unison. Rotation of these rods in one direction causes the posts 14 and 15 to move toward the posts 10 and 11, while rotation in the opposite direction causes the posts 14 and 15 to move away from the posts 10 and 11.

The post 10 is equipped with a pair of sprocket wheels 25 which are fixed thereto and the remaining posts are equipped with a similar pair of sprocket wheels 25 which are rotatably supported by the posts. A multiple section conveyer is supported by the sprocket wheels 25. Each section of the conveyer comprises a tubular magazine 26 having two pairs of cross plates 27 with apertures near their ends. These magazines are connected by links 28 having bores which register with the apertures in the plates 27 and bolts 29 are provided to extend through the apertures in the plates and the bores in the links for joining them together. The magazines are open at their lower ends and are provided with inwardly projecting prongs 30 which support a stack of envelopes or other articles contained within the magazines. The length of the conveyer can be readily changed by subtracting or adding magazines merely by removing or inserting a single link. Whenever a change is made in the length of the magazines, the rods 14 and 15 are moved toward or away from the rods 10 and 11 to compensate for the change in the length of the conveyer.

The base 12 supports a gear box 31 by means of which rotation of the shaft 10 is effected by rotation of the driving shaft 32 by means of a source of power (not shown). Rotation of the shaft 10 causes linear movement of the magazines 26 in a horizontal path. An extractor 33 is arranged below the path of the magazines and is actuated in timed relation thereto, to withdraw an article from each magazine in succession and locate said article in position to be seized by the gripper 34 which delivers the article to the feed rollers 35 of a printing press or other apparatus.

It is of course understood that various modifications may be made in the device above described, without in any way departing from the spirit of the invention as defined in the appended claims.

I claim:

1. A device of the character described comprising a pair of posts having fixed axes, a second pair of posts, rods having reversely threaded ends connecting said pairs of posts, means for rotating said rods in unison to effect movement of said second pair of posts toward and away from the first pair of posts, a plurality of magazines detachably inter-connected to form a conveyer of adjustable length, and means on said posts supporting said conveyer for linear movement.

2. A device of the character described comprising a pair of posts having fixed axes, a second pair of posts, rods having reversely threaded ends connecting said pairs of posts, sprocket wheels for rotating said rods in unison to effect movement of said second pair of posts toward and away from the first pair of posts carried by each rod, a chain trained around said sprocket wheel, a plurality of magazines detachably inter-connected to form a conveyer of adjustable length, and means on said posts supporting said conveyer for linear movement.

3. A device of the character described comprising a pair of posts having fixed axes, a second pair of posts, rods having reversely threaded ends connecting said pairs of posts, means for rotating said rods in unison to effect movement of the second pair of posts toward and away from the first pair of posts, a plurality of magazines detachably interconnected to form a conveyer of adjustable length, sprockets on said posts supporting said conveyer for linear movement, and means for rotating one of said sprockets.

4. A device of the character described comprising a pair of posts having fixed axes, a second pair of posts, rods having reversely threaded ends connecting said pairs of posts, a sprocket wheel carried by each rod, a chain trained around said sprocket wheels for rotating said rods in unison to effect movement of the second pair of posts toward and away from the first pair of posts, a plurality of magazines detachably interconnected to form a conveyer of adjustable length, sprockets on said posts supporting said conveyer for linear movement, and means for rotating one of said sprockets.

WESLEY P. SHOMAKER.

CERTIFICATE OF CORRECTION.

Patent No. 1,992,046.    February 19, 1935.

WESLEY P. SHOMAKER.

It is hereby certified that error appears in the printed specification of the above numbered patent requiring correction as follows: Page 2, first column, line 2, claim 2, beginning with the word "sprocket" strike out all to and including the word "wheel" in line 6, and insert instead the article and words, a sprocket wheel carried by each rod, a chain trained around said sprocket wheels for rotating said rods in unison to effect movement of said second pair of posts toward and away from the first pair of posts; and that the said Letters Patent should be read with this correction therein that the same may conform to the record of the case in the Patent Office.

Signed and sealed this 19th day of March, A. D. 1935.

Leslie Frazer (Seal)    Acting Commissioner of Patents.

pair of posts, rods having reversely threaded ends connecting said pairs of posts, sprocket wheels for rotating said rods in unison to effect movement of said second pair of posts toward and away from the first pair of posts carried by each rod, a chain trained around said sprocket wheel, a plurality of magazines detachably inter-connected to form a conveyer of adjustable length, and means on said posts supporting said conveyer for linear movement.

3. A device of the character described comprising a pair of posts having fixed axes, a second pair of posts, rods having reversely threaded ends connecting said pairs of posts, means for rotating said rods in unison to effect movement of the second pair of posts toward and away from the first pair of posts, a plurality of magazines detachably interconnected to form a conveyer of adjustable length, sprockets on said posts supporting said conveyer for linear movement, and means for rotating one of said sprockets.

4. A device of the character described comprising a pair of posts having fixed axes, a second pair of posts, rods having reversely threaded ends connecting said pairs of posts, a sprocket wheel carried by each rod, a chain trained around said sprocket wheels for rotating said rods in unison to effect movement of the second pair of posts toward and away from the first pair of posts, a plurality of magazines detachably interconnected to form a conveyer of adjustable length, sprockets on said posts supporting said conveyer for linear movement, and means for rotating one of said sprockets.

WESLEY P. SHOMAKER.

CERTIFICATE OF CORRECTION.

Patent No. 1,992,046.  February 19, 1935.

WESLEY P. SHOMAKER.

It is hereby certified that error appears in the printed specification of the above numbered patent requiring correction as follows: Page 2, first column, line 2, claim 2, beginning with the word "sprocket" strike out all to and including the word "wheel" in line 6, and insert instead the article and words, a sprocket wheel carried by each rod, a chain trained around said sprocket wheels for rotating said rods in unison to effect movement of said second pair of posts toward and away from the first pair of posts; and that the said Letters Patent should be read with this correction therein that the same may conform to the record of the case in the Patent Office.

Signed and sealed this 19th day of March, A. D. 1935.

Leslie Frazer (Seal)  Acting Commissioner of Patents.